US008532681B2

(12) United States Patent
Chin et al.

(10) Patent No.: US 8,532,681 B2
(45) Date of Patent: Sep. 10, 2013

(54) METHODS AND APPARATUS FOR IMPLEMENTING SHORT MESSAGE SYSTEMS (SMS) IN WIMAX SYSTEMS

(75) Inventors: Tom Chin, San Diego, CA (US); Steven Cheng, San Diego, CA (US); Kuo-Chun Lee, San Diego, CA (US); Guangming Carl Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1222 days.

(21) Appl. No.: 12/254,786

(22) Filed: Oct. 20, 2008

(65) Prior Publication Data

US 2010/0099442 A1   Apr. 22, 2010

(51) Int. Cl.
*H04W 4/00* (2009.01)
*H04M 1/00* (2006.01)

(52) U.S. Cl.
USPC .......................................... 455/466; 455/574

(58) Field of Classification Search
USPC ................. 455/466; 370/335, 342–345, 349, 370/496, 522, 210, 329, 331
See application file for complete search history.

(56) References Cited

U.S. PATENT DOCUMENTS

| 7,343,167 | B2 | 3/2008 | Kang et al. |
| 7,620,020 | B2 * | 11/2009 | Lim et al. ...................... 370/335 |
| 2005/0177733 | A1 | 8/2005 | Stadelmann et al. |
| 2007/0189239 | A1 * | 8/2007 | Lim et al. ...................... 370/337 |
| 2008/0031128 | A1 | 2/2008 | Jang et al. |
| 2009/0061916 | A1 * | 3/2009 | Kim et al. ..................... 455/466 |
| 2010/0202378 | A1 * | 8/2010 | Youn et al. .................... 370/329 |

FOREIGN PATENT DOCUMENTS

EP  1906688  4/2008

OTHER PUBLICATIONS

Hang Zhang et al: "Title Support of Short Data Burst Transmission to/from an MSS in Sleep Mode or Idle Mode" Internet Citation Nov. 4, 2004, XP003001673.
International Search Report—PCT/US2009/060191—International Search Authority, European Patent Office, Feb. 22, 2010.
Yong Chan, SeoungIl Yoon, Geunhwi Lim, Samsung Electronics Co. Ltd: Support of Small Packet Data Transmission to/from an MSS in Idle ModelEEE 802.16 Broadband Wireless Access Working Group IEEE C802.16e-05/75 Jan. 10, 2005, pp. 1-4, XP002567375.
Taiwan Search Report—TW098135446—TIPO—Feb. 7, 2013.

* cited by examiner

*Primary Examiner* — Charles Appiah
*Assistant Examiner* — Emem Stephen
(74) *Attorney, Agent, or Firm* — Tyler J. Overall

(57) ABSTRACT

In accordance with a method for implementing Short Message Service (SMS) in a WiMAX network, a mobile station may send a mobile station SMS request message to a base station. The mobile station SMS request message may include mobile-originated SMS data. In response, the base station may send a base station SMS response message back to the mobile station. For mobile-terminated SMS data, the base station may send a base station SMS request message to the mobile station. The base station SMS request message may include the mobile-terminated SMS data. In response, the mobile station may send a mobile station SMS response message to the base station. Ranging procedures and medium access control (MAC) management messages may be used to allocate bandwidth for the various messages.

48 Claims, 10 Drawing Sheets

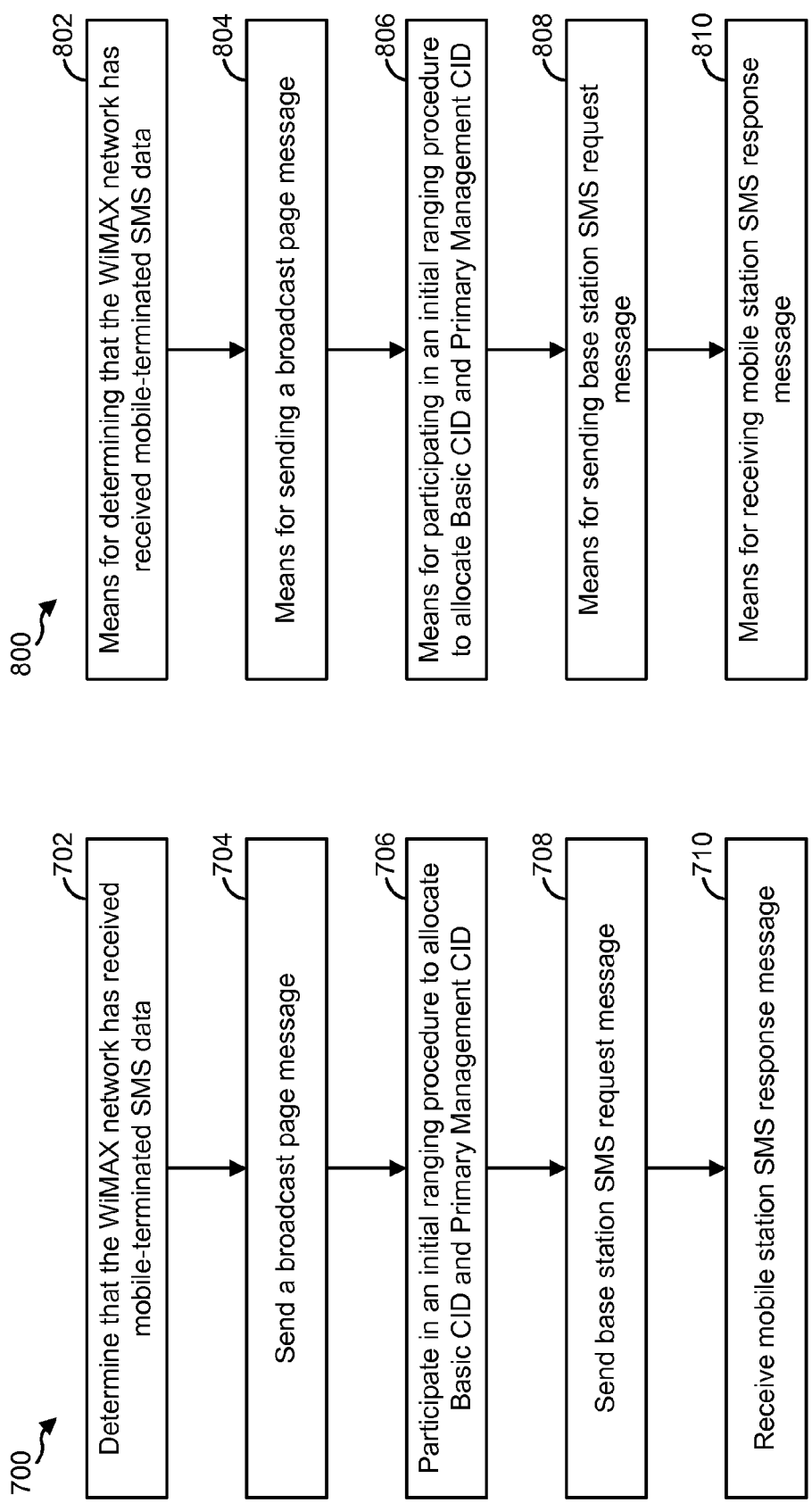

METHODS AND APPARATUS FOR IMPLEMENTING SHORT MESSAGE SYSTEMS (SMS) IN WIMAX SYSTEMS

TECHNICAL FIELD

The present disclosure relates generally to wireless communication systems. More specifically, the present disclosure relates to methods and apparatus for implementing Short Message Service (SMS) in WiMAX systems.

BACKGROUND

Wireless communication systems have become an important means by which many people worldwide have come to communicate. A wireless communication system may provide communication for a number of mobile stations, each of which may be serviced by a base station. As used herein, the term "mobile station" refers to an electronic device that may be used for voice and/or data communication over a wireless communication system. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, a mobile device, a wireless device, user equipment, or some other similar terminology. The term "base station" refers to a wireless communication station that is installed at a fixed location and used to communicate with mobile stations. A base station may alternatively be referred to as an access point, a Node B, an evolved Node B, or some other similar terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication system (e.g., bandwidth and transmit power) may be shared among multiple mobile stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

BRIEF DESCRIPTION OF THE DRAWINGS

FIG. 7 illustrates a method for sending mobile-terminated SMS data in accordance with the present disclosure;

FIG. 8 illustrates means-plus-function blocks corresponding to the method of FIG. 7;

SUMMARY

Figure 1:
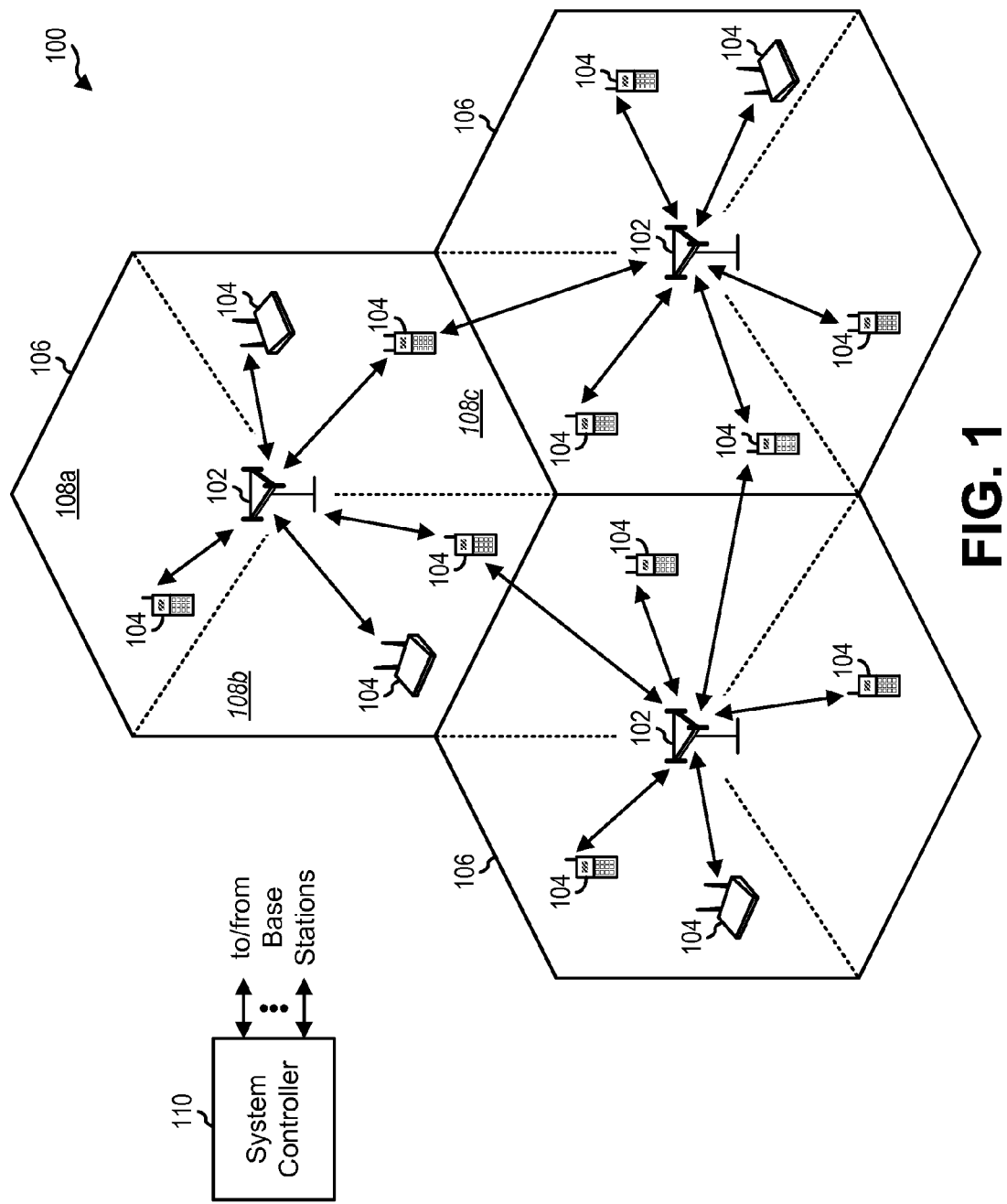
FIG. 1 illustrates an example of a wireless communication system in which the methods disclosed herein may be utilized.

A method for implementing Short Message Service (SMS) is disclosed. The method may be implemented by a mobile station in idle mode in a WiMAX network. The method may include sending a mobile station SMS request message to a base station. The mobile station SMS request message may include mobile-originated SMS data. The method may also include receiving a base station SMS response message from the base station in response to sending the mobile station SMS request message. The method may also include receiving a base station SMS request message from the base station. The base station SMS request message may include mobile-terminated SMS data. The method may also include sending a mobile station SMS response message to the base station in response to receiving the base station SMS request message. Ranging procedures and medium access control (MAC) management messages may be used to allocate bandwidth for the mobile station SMS request message, the base station SMS response message, the base station SMS request message, and the mobile station SMS response message.

A method for implementing Short Message Service (SMS) is disclosed. The method may be implemented by a base station in a WiMAX network. The method may include receiving a mobile station SMS request message from a mobile station. The mobile station SMS request message may include mobile-originated SMS data. The method may also include sending a base station SMS response message to the mobile station in response to receiving the mobile station SMS request message. The method may also include sending a base station SMS request message to the mobile station. The base station SMS request message may include mobile-terminated SMS data. The method may further include receiving a mobile station SMS response message from the mobile station in response to sending the base station SMS request message. Ranging procedures and medium access control (MAC) management messages may be used to allocate bandwidth for the mobile station SMS request message, the base station SMS response message, the base station SMS request message, and the mobile station SMS response message.

A mobile station configured for implementing Short Message Service (SMS) while in idle mode is disclosed. The mobile station may be configured for operation in a WiMAX network. The mobile station may include a processor, and memory in electronic communication with the processor. The mobile station may also include instructions stored in the memory. The instructions may be executable by the processor to send a mobile station SMS request message to a base station. The mobile station SMS request message may include mobile-originated SMS data. The instructions may also be executable to receive a base station SMS response message from the base station in response to sending the mobile station SMS request message. The instructions may also be executable to receive a base station SMS request message from the base station. The base station SMS request message may include mobile-terminated SMS data. The instructions may further be executable to send a mobile station SMS response message to the base station in response to receiving the base station SMS request message. Ranging procedures and medium access control (MAC) management messages may be used to allocate bandwidth for the mobile station SMS request message, the base station SMS response message, the base station SMS request message, and the mobile station SMS response message.

A base station for implementing Short Message Service (SMS) is disclosed. The base station may be configured for operation in a WiMAX network. The base station may include a processor, and memory in electronic communication with the processor. The base station may also include instructions stored in the memory. The instructions may be executable by the processor to receive a mobile station SMS request message from a mobile station. The mobile station SMS request message may include mobile-originated SMS data. The instructions may also be executable to send a base station SMS response message to the mobile station in response to receiving the mobile station SMS request message. The instructions may also be executable to send a base station SMS request message to the mobile station. The base station SMS request message may include mobile-terminated SMS data. The instructions may also be executable to receive a mobile station SMS response message from the mobile station in response to sending the base station SMS request message. Ranging procedures and medium access control (MAC) management messages may be used to allocate bandwidth for the mobile station SMS request message, the base station SMS response message, the base station SMS request message, and the mobile station SMS response message.

A mobile station configured for implementing Short Message Service (SMS) while in idle mode is disclosed. The mobile station may be configured for operation in a WiMAX network. The mobile station may include means for sending a mobile station SMS request message to a base station. The mobile station SMS request message may include mobile-originated SMS data. The mobile station may also include means for receiving a base station SMS response message from the base station in response to sending the mobile station SMS request message. The mobile station may also include means for receiving a base station SMS request message from the base station. The base station SMS request message may include mobile-terminated SMS data. The mobile station may also include means for sending a mobile station SMS response message to the base station in response to receiving the base station SMS request message. Ranging procedures and medium access control (MAC) management messages may be used to allocate bandwidth for the mobile station SMS request message, the base station SMS response message, the base station SMS request message, and the mobile station SMS response message.

A base station for implementing Short Message Service (SMS) is disclosed. The base station may be configured for operation in a WiMAX network. The base station may include means for receiving a mobile station SMS request message from a mobile station. The mobile station SMS request message may include mobile-originated SMS data. The mobile station may also include means for sending a base station SMS response message to the mobile station in response to receiving the mobile station SMS request message. The mobile station may also include means for sending a base station SMS request message to the mobile station. The base station SMS request message may include mobile-terminated SMS data. The base station may also include means for receiving a mobile station SMS response message from the mobile station in response to sending the base station SMS request message. Ranging procedures and medium access control (MAC) management messages may be used to allocate bandwidth for the mobile station SMS request message, the base station SMS response message, the base station SMS request message, and the mobile station SMS response message.

A computer-program product for a mobile station in idle mode in a WiMAX network to implement Short Message Service (SMS) is disclosed. The computer-program product may include a computer-readable medium having instructions thereon. The instructions may include code for sending a mobile station SMS request message to a base station. The mobile station SMS request message may include mobile-originated SMS data. The instructions may also include code for receiving a base station SMS response message from the base station in response to sending the mobile station SMS request message. The instructions may also include code for receiving a base station SMS request message from the base station. The base station SMS request message may include mobile-terminated SMS data. The instructions may further include code for sending a mobile station SMS response message to the base station in response to receiving the base station SMS request message. Ranging procedures and medium access control (MAC) management messages may be used to allocate bandwidth for the mobile station SMS request message, the base station SMS response message, the base station SMS request message, and the mobile station SMS response message.

A computer-program product for a base station in a WiMAX network to implement Short Message Service (SMS) is disclosed. The computer-program product may include a computer-readable medium having instructions thereon. The instructions may include code for receiving a mobile station SMS request message from a mobile station. The mobile station SMS request message may include mobile-originated SMS data. The instructions may also include code for sending a base station SMS response message to the mobile station in response to receiving the mobile station SMS request message. The instructions may also include code for sending a base station SMS request message to the mobile station. The base station SMS request message may include mobile-terminated SMS data. The instructions may also include code for receiving a mobile station SMS response message from the mobile station in response to sending the base station SMS request message. Ranging procedures and medium access control (MAC) management messages may be used to allocate bandwidth for the mobile station SMS request message, the base station SMS response message, the base station SMS request message, and the mobile station SMS response message.

DETAILED DESCRIPTION

The methods and apparatus disclosed herein may be implemented in WiMAX systems. The term "WiMAX" refers to a family of standards that is prepared by the Institute of Electronic and Electrical Engineers (IEEE) 802.16 Working Group on Broadband Wireless Access Standards. Thus, the term "WiMAX system" refers to a wireless communication system that is configured in accordance with one or more WiMAX standards.

The present disclosure relates generally to the Short Message Service (SMS). SMS is a communications protocol allowing the interchange of short text messages between mobile stations. SMS technology has facilitated the development and growth of text messaging. However, current WiMAX standards do not indicate how SMS may be implemented in a WiMAX system.

In accordance with current WiMAX standards, before a mobile station that is in the idle mode (i.e., a mobile station that does not currently have any traffic connections) can transmit any data packets, the mobile station exits the idle mode and establishes a new traffic connection. However, establishing a traffic connection for sending a small amount of data can waste the processing and bandwidth of various entities.

The present disclosure relates to techniques for a mobile station to send and receive Short Message Service (SMS) data in WiMAX systems. In accordance with the present disclosure, the following new messages are defined: mobile station SMS request messages, base station SMS response messages, base station SMS request messages, and mobile station SMS response messages.

When SMS data arises at a mobile station, the mobile station may send a mobile station SMS request message to the base station. The mobile station SMS request message may include the SMS data. In response to receiving the mobile station SMS request message, the base station may send a base station SMS response message back to the mobile station.

Conversely, when SMS data that is destined for a mobile station is received by a WiMAX network, the base station may send a base station SMS request message to the mobile station. The base station SMS request message may include the SMS data. In response to receiving the base station SMS request message, the mobile station may send a mobile station SMS response message back to the base station.

Ranging procedures and medium access control (MAC) management messages may be used to allocate bandwidth for the aforementioned messages, as will be described in greater detail below. Advantageously, the techniques described herein allow a mobile station in idle mode to send and receive SMS data without having to establish a traffic connection with a base station.

As used herein, the term "mobile-originated SMS data" refers to SMS data that is sent by a mobile station. The term "mobile-terminated SMS data" refers to SMS data that is received at a mobile station.

FIG. 1 shows an example of a wireless communication system 100 in which the methods disclosed herein may be utilized. The wireless communication system 100 includes multiple base stations (BS) 102 and multiple mobile stations (MS) 104. Each base station 102 provides communication coverage for a particular geographic area 106. The term "cell" can refer to a base station 102 and/or its coverage area 106 depending on the context in which the term is used.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100. A mobile station 104 may communicate with zero, one, or multiple base stations 104 on the downlink and/or uplink at any given moment.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

Figure 2:
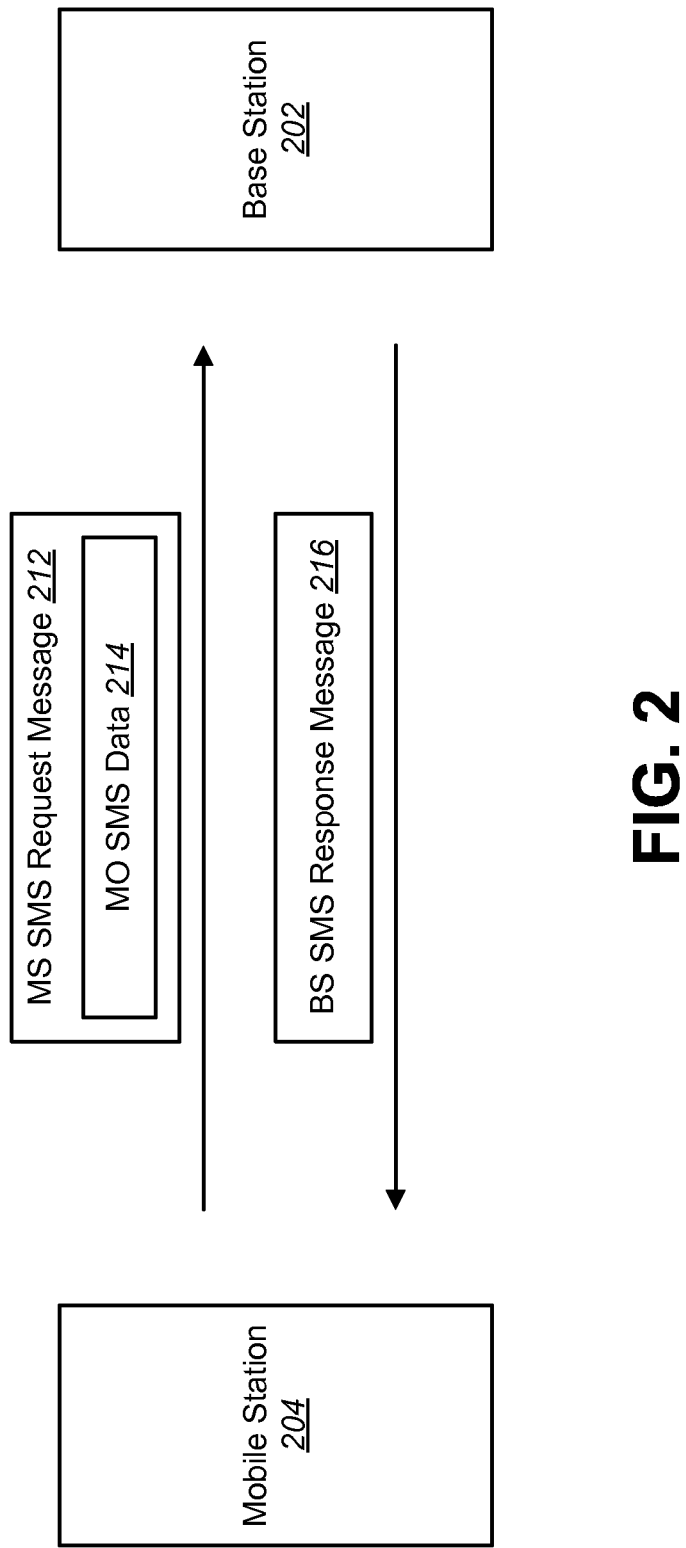
FIG. 2 illustrates in general terms how a mobile station may send mobile-originated SMS data in accordance with the present disclosure.

FIG. 2 illustrates in general terms how a mobile station 204 may send mobile-originated SMS data 214 in accordance with the present disclosure. As shown, the mobile station 204 may send a mobile station SMS request message 212 to a base station 202. The mobile station SMS request message 212 may include the mobile-originated SMS data 214. In response to receiving the mobile station SMS request message 212, the base station 202 may send a base station SMS response message 216 back to the mobile station 204. Ranging procedures and MAC management messages may be used to allocate bandwidth for the mobile station SMS request message 212 and the base station SMS response message 216, as will be described in greater detail below.

Figure 3:
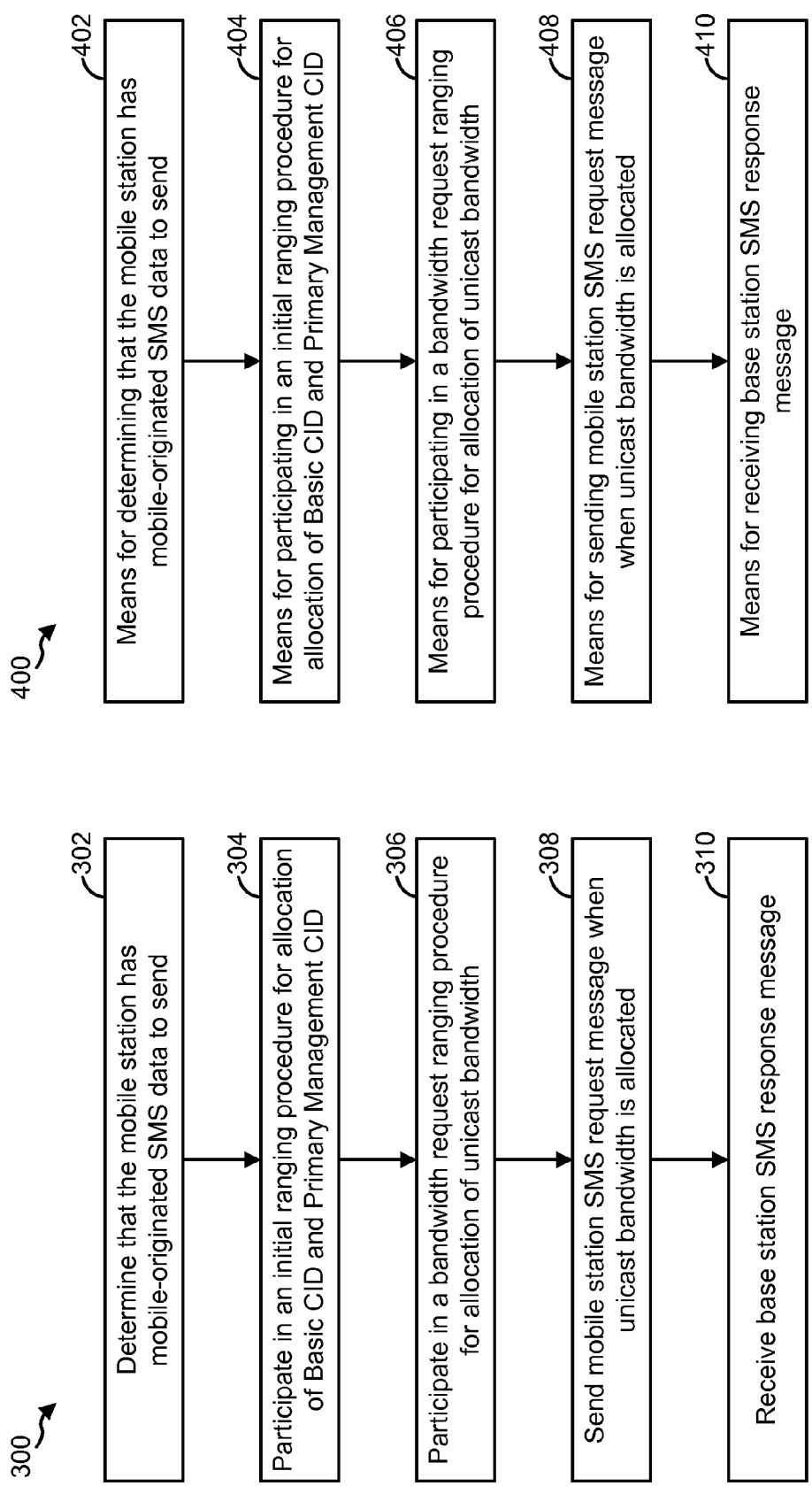
FIG. 3 illustrates a method for sending mobile-originated SMS data in accordance with the present disclosure.

FIG. 3 illustrates a method 300 for sending mobile-originated SMS data 214 in accordance with the present disclosure. The method 300 may be implemented by a mobile station 204.

At some point, the mobile station 204 may determine 302 that it has mobile-originated SMS data 214 to send. The mobile-originated SMS data 214 may be originated by an SMS application that is running on the mobile station 204. In response to making this determination 302, the mobile station 204 may initiate and participate 304 in an initial ranging procedure. The initial ranging procedure may result in allocation of a Basic Connection Identifier (CID) and a Primary Management CID to the mobile station 204.

The mobile station 204 may also participate 306 in a bandwidth request ranging procedure with the base station 202. During the bandwidth request ranging procedure, the mobile station 204 may request that the base station 202 allocate unicast bandwidth for the mobile station 204 to transmit a mobile station SMS request message 212. The mobile station 204 may send 308 a mobile station SMS request message 212 to the base station 202 when the unicast bandwidth is allocated. In response to sending the mobile station SMS request message 212, the mobile station 204 may receive a base station SMS response message 216 from the base station 202.

Figure 4:
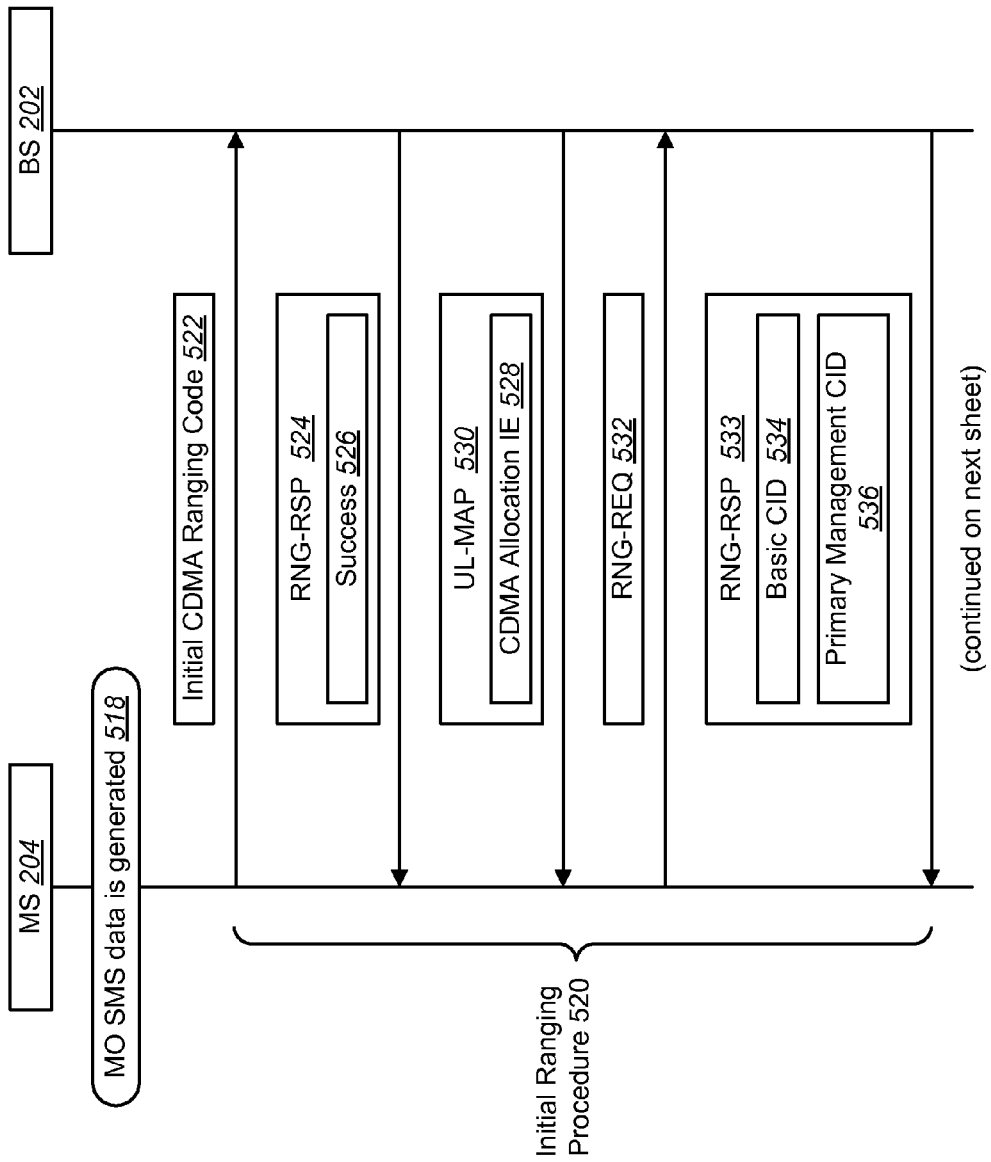
FIG. 4 illustrates means-plus-function blocks corresponding to the method of FIG. 3.

The method 300 of FIG. 3 described above may be performed by various hardware and/or software component(s) and/or module(s) corresponding to the means-plus-function blocks 400 illustrated in FIG. 4. In other words, blocks 302 through 310 illustrated in FIG. 3 correspond to means-plus-function blocks 402 through 410 illustrated in FIG. 4.

Figure 5:
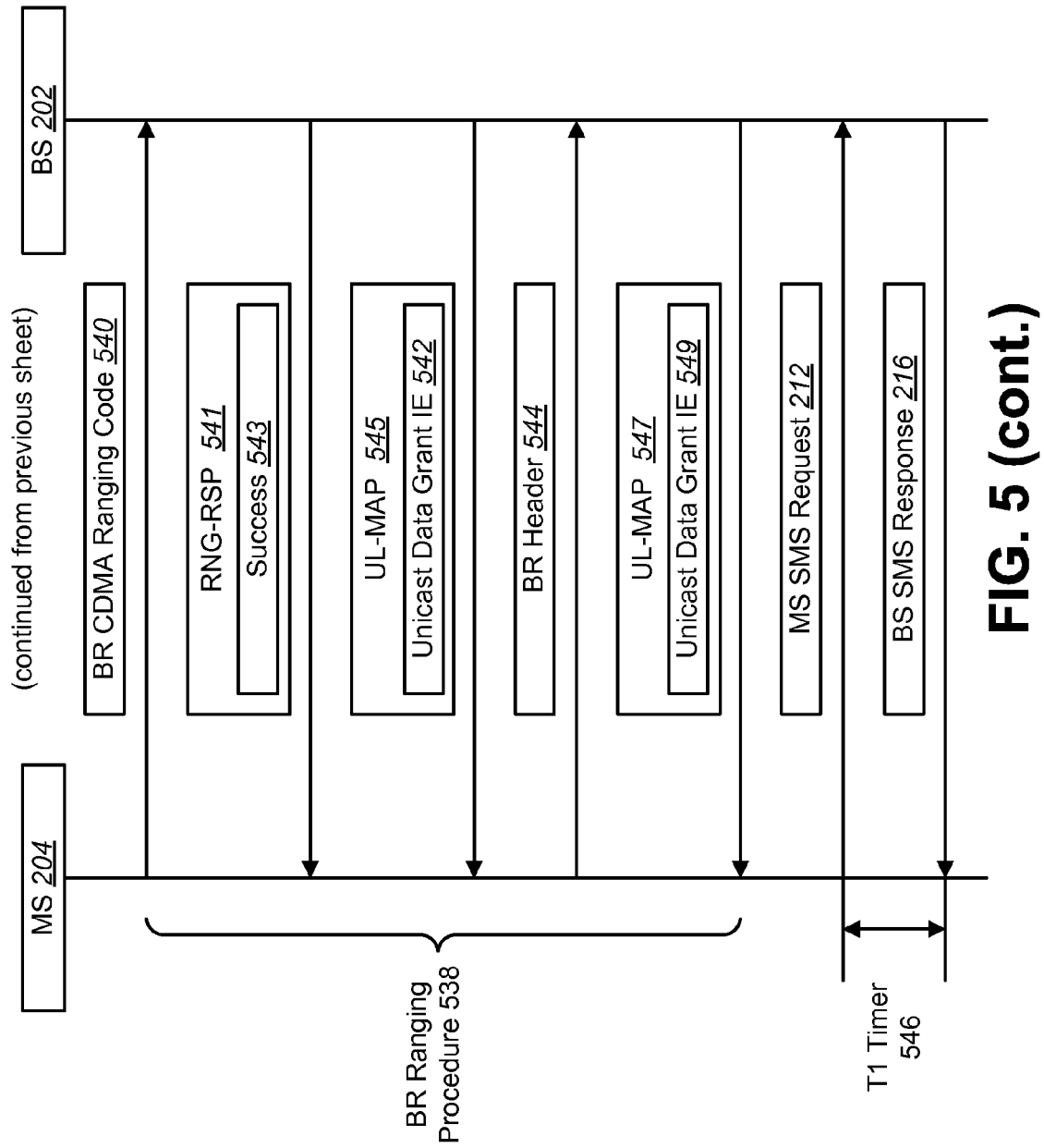
FIG. 5 illustrates in greater detail how a mobile station may send mobile-originated SMS data in accordance with the present disclosure.

FIG. 5 illustrates in greater detail how a mobile station 204 may send mobile-originated SMS data 214 in accordance with the present disclosure. FIG. 5 also illustrates how ranging procedures and MAC management messages may be used to allocate bandwidth for the mobile station SMS request message 212 and the base station SMS response message 216.

At some point, the mobile station 204 may determine 518 that mobile-originated SMS data 214 has been generated 518 and is ready to send. In response to making this determination 518, the mobile station 204 may initiate an initial ranging procedure 520. Both the mobile station 204 and the base station 202 may participate in the initial ranging procedure 520. As part of the initial ranging procedure 520, the mobile station 204 may send an initial CDMA ranging code 522 to the base station 202. The base station 202 may reply by sending a ranging response message (RNG-RSP) 524 to the mobile station 204. Assuming that the status of the ranging response message 524 is success 526, the base station 202 may allocate a unicast transmission opportunity to the mobile station 204 using a CDMA Allocation Information Element (IE) 528 in the uplink MAP (UL-MAP) message 530.

The mobile station 204 may send a ranging request message (RNG-REQ) 532 to the base station 202. In response, the base station 202 may send another ranging response message (RNG-RSP) 533 to the mobile station 204. The ranging response message 533 may include a Basic CID 534 and a Primary Management CID 536 that the base station 202 allocates to the mobile station 204.

After the mobile station 204 and the base station 202 complete the initial ranging procedure 520, the mobile station 204 may initiate the bandwidth request ranging procedure 538. The mobile station 204 may send a bandwidth request (BR) CDMA ranging code 540 to the base station 202. The base station 202 may reply by sending a ranging response message (RNG-RSP) 541 to the mobile station 204. Assuming that the status of the ranging response message 541 is success 543, then the base station 202 may allocate a unicast data grant in a UL-MAP message 545. The unicast data grant may be allocated in a Unicast Data Grant IE 542.

The mobile station 204 may send a bandwidth request (BR) header 544 to the base station 202 to indicate the bandwidth needed to transmit the mobile-originated SMS data 214. When the base station 202 receives the bandwidth request header 544, it allocates a unicast data grant in the UL-MAP message 547 for the mobile station 204 to send the mobile station SMS request message 212. This allocation may occur by means of a Unicast Data Grant IE 549 in the UL-MAP message 547.

When the mobile station 204 receives the unicast data grant, it may send the mobile station SMS request message 212 to the base station 202. When the base station 202 receives the mobile station SMS request message 212 from the mobile station 204, the base station 202 may reply by sending a base station SMS response message 216 to the mobile station 204.

In the event that the mobile station 204 does not receive the base station SMS response message 216 within a timer T1 546 after sending the mobile station SMS request message 212, the mobile station 204 may perform the bandwidth request ranging procedure 538 again and re-send the mobile station SMS request message 212. The mobile station 204 may repeat the bandwidth request ranging procedure 538 and re-send the mobile station SMS request message 212 to the base station 202 up to N times, where N may be a configurable parameter.

Figure 6:
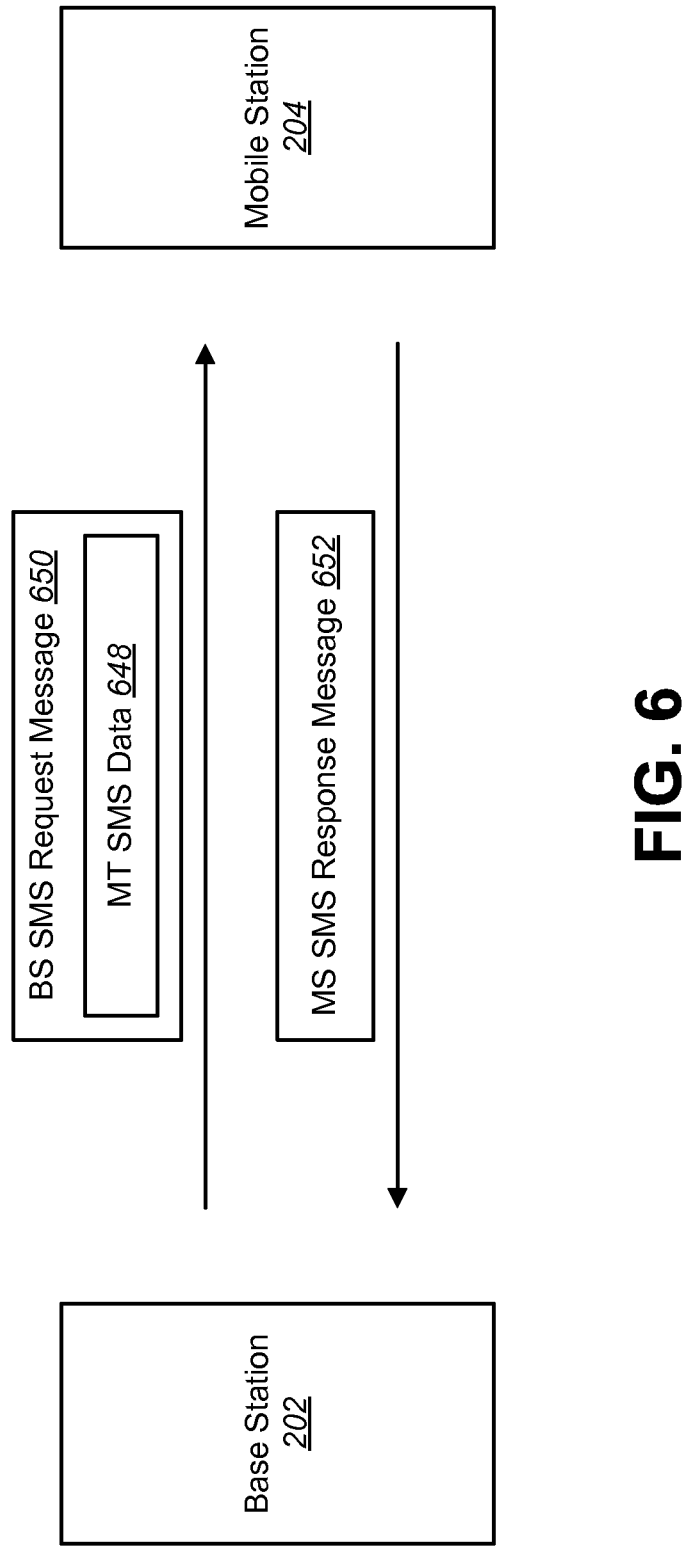
FIG. 6 illustrates in general terms how a mobile station may receive mobile-terminated SMS data in accordance with the present disclosure.

FIG. 6 illustrates in general terms how a mobile station 204 may receive mobile-terminated SMS data 648 in accordance with the present disclosure. When mobile-terminated SMS data 648 is received by the WiMAX network, the base station 202 may send a base station SMS request message 650 to the mobile station 204. The base station SMS request message 650 may include the mobile-terminated SMS data 648. In response to receiving the base station SMS request message 650, the mobile station 204 may send a mobile station SMS response message 652 to the base station 202. Ranging procedures and MAC management messages may be used to allocate bandwidth for the base station SMS request message 650 and the mobile station SMS response message 652, as will be described in greater detail below.

FIG. 7 illustrates a method 700 for sending mobile-terminated SMS data 648 in accordance with the present disclosure. The method 700 may be implemented by a base station 202.

At some point, the base station 202 may determine 702 that the WiMAX network has received mobile-terminated SMS data 648 that is intended for a particular mobile station 204. In response, the base station 202 may send 704 a broadcast page message. The broadcast page message may include a MAC address hash of the mobile station 204 for which the mobile-terminated SMS data 648 is intended. In addition, an action code of the broadcast page message may indicate that there is a downlink message pending for the mobile station 204.

The base station 202 may then participate 706 in an initial ranging procedure to allocate a Basic CID and a Primary Management CID to the mobile station 204. Following the initial ranging procedure, the base station 202 may send 708 a base station SMS request message 650 to the mobile station 204. The base station SMS request message 650 may include the mobile-terminated SMS data 648. In response to sending the base station SMS request message 650, the base station 202 may receive a mobile station SMS response message 652 from the mobile station 204.

The method 700 of FIG. 7 described above may be performed by various hardware and/or software component(s) and/or module(s) corresponding to the means-plus-function blocks 800 illustrated in FIG. 8. In other words, blocks 702 through 710 illustrated in FIG. 7 correspond to means-plus-function blocks 802 through 810 illustrated in FIG. 8.

Figure 9:
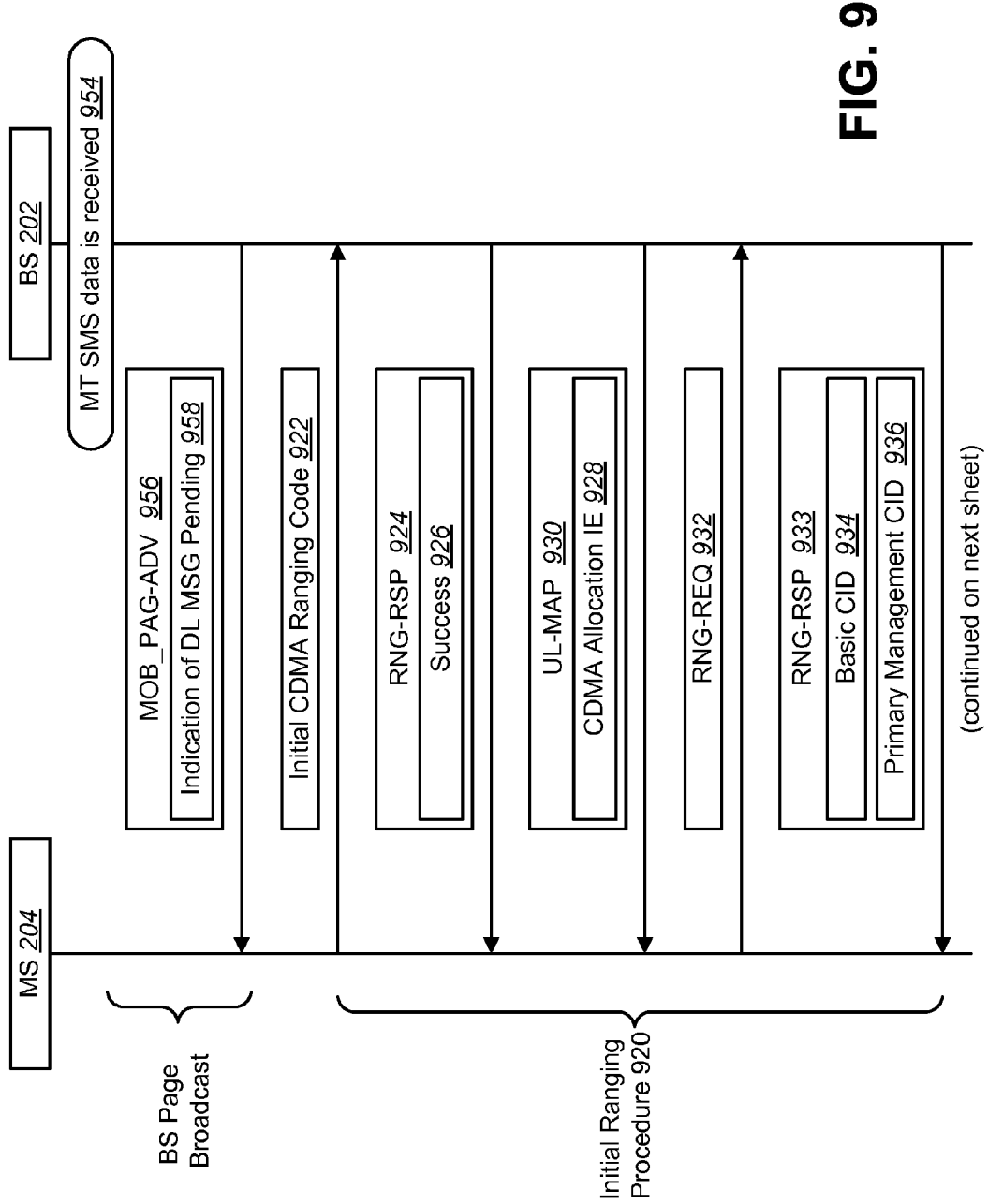
FIG. 9 illustrates in greater detail how a base station may send mobile-terminated SMS data in accordance with the present disclosure.
Figure 9:
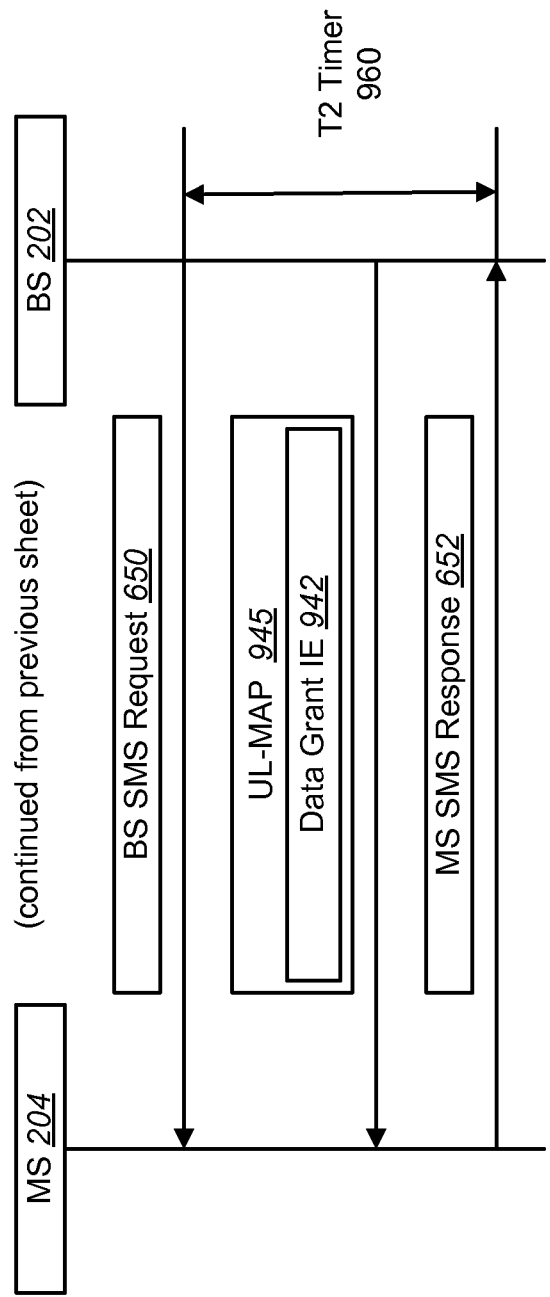

FIG. 9 illustrates in greater detail how a base station 202 may send mobile-terminated SMS data 648 in accordance with the present disclosure. FIG. 9 also illustrates how ranging procedures and MAC management messages may be used to allocate bandwidth for the base station SMS request message 650 and the mobile station SMS response message 652.

At some point, the base station 202 may determine that the WiMAX network has received 954 mobile-terminated SMS data 648 that should be sent to the mobile station 204. In response, the base station 202 may send a broadcast page message (MOB_PAG-ADV) 956. The broadcast page message 956 may include a 24-bit MAC address hash of the receiving mobile station 204. In addition, the broadcast page message 956 may include an indication 958 that there is a downlink message pending for the mobile station 204. This indication 958 may take the form of an enumeration value for the action code in the broadcast page message 956. The enumeration value may be specifically defined to indicate that there is a downlink message pending for the mobile station 204.

When the mobile station 204 receives the broadcast page message 956 with the indication 958 that there is a downlink message pending for the mobile station 204, the mobile station 204 may initiate the initial ranging procedure 920. In particular, the mobile station 204 may send an initial CDMA ranging code 922 to the base station 202. The base station 202 may reply by sending a ranging response message (RNG-RSP) 924 to the mobile station 204. Assuming that the status of the ranging response message 924 is success 926, the base station 202 may allocate a unicast transmission opportunity for the mobile station 204 by means of a CDMA Allocation IE 928 in the UL-MAP message 930.

When this unicast transmission opportunity has been allocated, the mobile station 204 may send a ranging request message (RNG-REQ) 932 to the base station 202. When the base station 202 receives the ranging request message 932, the base station 202 may reply by sending a ranging response message (RNG-RSP) 933 to the mobile station 204. The ranging response message 933 may include a Basic CID 934 and a Primary Management CID 936 that the base station 202 allocates to the mobile station 204.

After the base station 202 sends the ranging response message 933 with the Basic CID 934 and the Primary Management CID 936, the base station 202 may send a base station SMS request message 650 to the mobile station 204 with either the Basic CID 934 or the Primary Management CID 936. When the mobile station 204 receives the base station SMS request message 650, it may reply by sending a mobile station SMS response message 652 to the base station 202. The base station 202 may allocate a data burst in a UL-MAP message 945 (via a Unicast Data Grant IE 942) for the mobile station 204 to send a mobile station SMS response message 652.

In the event that the base station 202 does not receive the mobile station SMS response message 652 within timer T2 960 after sending the base station SMS request message 650, the base station 202 may re-send the base station SMS request message 650 to the mobile station 204 up to N times, where N may be a configurable parameter.

Figure 10:
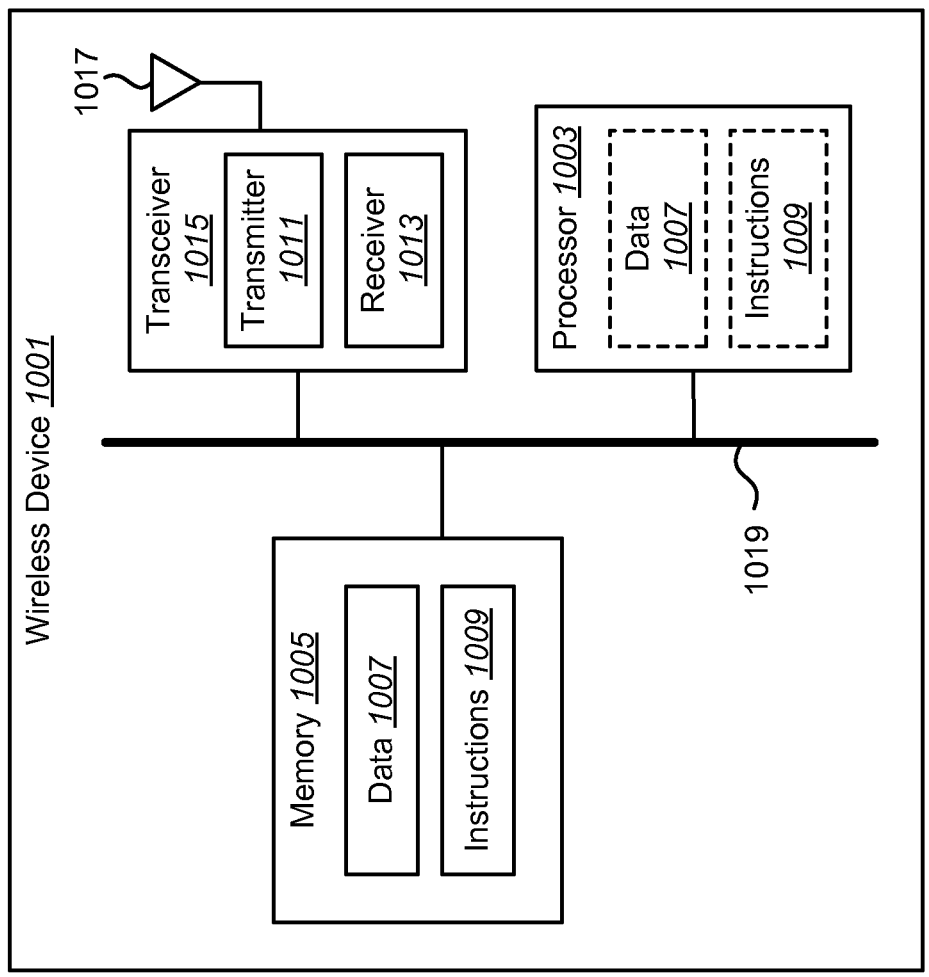
FIG. 10 illustrates certain components that may be included within a wireless device.

FIG. 10 illustrates certain components that may be included within a wireless device 1001. The wireless device 1001 may be a mobile station 204 or a base station 202.

The wireless device 1001 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless device 1001 of FIG. 10, in an alternative configuration, a combination of processors (e.g., an ARM and DSP) could be used.

The wireless device 1001 also includes memory 1005. The memory 1005 may be any electronic component capable of storing electronic information. The memory 1005 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1007 and instructions 1009 may be stored in the memory 1005. The instructions 1009 may be executable by the processor 1003 to implement the methods disclosed herein. Executing the instructions 1009 may involve the use of the data 1007 that is stored in the memory 1005.

The wireless device 1001 may also include a transmitter 1011 and a receiver 1013 to allow transmission and reception of signals between the wireless device 1001 and a remote location. The transmitter 1011 and receiver 1013 may be collectively referred to as a transceiver 1015. An antenna 1017 may be electrically coupled to the transceiver 1015. The wireless device 1001 may also include (not shown) multiple transmitters, multiple receivers, multiple transceivers and/or multiple antenna.

The various components of the wireless device 1001 may be coupled together by one or more buses, which may include a power bus, a control signal bus, a status signal bus, a data bus, etc. For the sake of clarity, the various buses are illustrated in FIG. 10 as a bus system 1019.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for implementing Short Message Service (SMS), the method being implemented by a mobile station in idle mode in a WiMAX network, the method comprising:
    participating in an initial ranging procedure in response to determining that the mobile station has mobile-originated SMS data to send;
    participating in a bandwidth request ranging procedure in order to request that the base station allocate unicast bandwidth, the bandwidth request ranging procedure comprising:
        receiving allocation of a first unicast data grant via a Unicast Data Grant Information Element (IE) in a first uplink MAP (UL-MAP); and
        sending a bandwidth request header to the base station to indicate the bandwidth needed to transmit the mobile-originated SMS data, the bandwidth request header being sent via the first unicast data grant to request allocation of unicast bandwidth;
    sending a mobile station SMS request message to a base station, wherein the mobile station SMS request message is sent using the allocated unicast bandwidth and comprises the mobile-originated SMS data; and
    receiving a base station SMS response message from the base station in response to sending the mobile station SMS request message.

2. The method of claim 1, wherein the initial ranging procedure results in allocation of a Basic Connection Identifier (CID) and a Primary Management CID to the mobile station.

3. The method of claim 2, wherein participating in the initial ranging procedure comprises:
    sending an initial Code Division Multiple Access (CDMA) ranging code to the base station;
    receiving a first ranging response message from the base station;
    receiving allocation of a unicast transmission opportunity via a CDMA Allocation Information Element (IE) in an uplink MAP (UL-MAP) message;
    sending a ranging request message to the base station; and
    receiving a second ranging response message from the base station, wherein the second ranging response message comprises the Basic CID and the Primary Management CID.

4. The method of claim 2, wherein participating in the bandwidth request ranging procedure comprises:
    sending a bandwidth request Code Division Multiple Access (CDMA) ranging code to the base station;
    receiving a first ranging response message from the base station for allocation of the first unicast data grant; and
    receiving allocation of a second unicast data grant via a second UL-MAP message according to the bandwidth request header, wherein the mobile station SMS request message is sent via the second unicast data grant.

5. The method of claim 2, further comprising:
    determining that the mobile station has not received the base station SMS response message from the base station within a timer T1 after sending the mobile station SMS request message; and
    repeating the bandwidth request ranging procedure and re-sending the mobile station SMS request message to the base station up to N times, wherein N is a configurable parameter.

6. The method of claim 1, further comprising:
    receiving a broadcast page message, wherein the broadcast page message comprises a medium access control (MAC) address hash of the mobile station, and wherein an action code of the broadcast page message indicates that there is a downlink message pending for the mobile station;
    participating in an initial ranging procedure in response to receiving the broadcast page message, wherein the initial ranging procedure results in allocation of a Basic Connection Identifier (CID) and a Primary Management CID to the mobile station;
    wherein the base station SMS request message is received from the base station with at least one of the Basic CID and the Primary Management CID.

7. The method of claim 1, further comprising receiving allocation of a data burst via an uplink MAP (UL-MAP) message for sending the mobile station SMS response message.

8. A method for implementing Short Message Service (SMS), the method being implemented by a base station in a WiMAX network, the method comprising:
    participating in an initial ranging procedure with the mobile station;
    participating in a bandwidth request ranging procedure with the mobile station, the bandwidth request ranging procedure comprising:
        sending allocation of a first unicast data grant via a Unicast Data Grant Information Element (IE) in a first uplink MAP (UL-MAP); and receiving a bandwidth request header from the mobile station to indicate the bandwidth needed to transmit the mobile-originated SMS data, the bandwidth request header being received via the first unicast data grant, the bandwidth request header comprises a request for an allocation of unicast bandwidth;

allocating unicast bandwidth to the mobile station according to the bandwidth request header;

receiving a mobile station SMS request message from a mobile station, wherein the mobile station SMS request message comprises the mobile-originated SMS data and the mobile station uses the allocated unicast bandwidth to send the mobile station SMS request message; and sending a base station SMS response message to the mobile station in response to receiving the mobile station SMS request message.

9. The method of claim 8, wherein the base station allocates a Basic Connection Identifier (CID) and a Primary Management CID to the mobile station during the initial ranging procedure.

10. The method of claim 9, wherein participating m the initial ranging procedure comprises:

receiving an initial Code Division Multiple Access (CDMA) ranging code from the mobile station;

sending a first ranging response message to the mobile station;

allocating a unicast transmission opportunity to the mobile station via a CDMA Allocation Information Element (IE) in an uplink MAP (UL-MAP) message;

receiving a ranging request message from the mobile station; and sending a second ranging response message to the mobile station, wherein the second ranging response message comprises the Basic CID and the Primary Management CID.

11. The method of claim 9, wherein participating in the bandwidth request ranging procedure comprises:

receiving a bandwidth request Code Division Multiple Access (CDMA) ranging code from the mobile station;

sending a first ranging response message to the mobile station to allocate the first unicast data grant; and allocating a second unicast data grant via a second UL-MAP message according to the bandwidth request header, wherein the mobile station SMS request message is sent via the second unicast data grant.

12. The method of claim 8, further comprising:

sending a broadcast page message in response to the WiMAX network receiving the mobile-terminated SMS data, wherein the broadcast page message comprises a medium access control (MAC) address hash of the mobile station, and wherein an action code of the broadcast page message indicates that there is a downlink message pending for the mobile station;

participating in an initial ranging procedure with the mobile station, wherein the base station allocates a Basic Connection Identifier (CID) and a Primary Management CID to the mobile station during the initial ranging procedure; and sending the base station SMS request message to the mobile station with at least one of the Basic CID and the Primary Management CID.

13. The method of claim 8, further comprising allocating a data burst via an uplink MAP (UL-MAP) message for the mobile station to send the mobile station SMS response message.

14. The method of claim 8, further comprising:

determining that the base station has not received the mobile station SMS response message from the mobile station within a timer T2 after sending the base station SMS request message; and re-sending the base station SMS request message to the mobile station up to N times, wherein N is a configurable parameter.

15. A mobile station configured for implementing Short Message Service (SMS) while in idle mode, the mobile station being configured for operation in a WiMAX network, the mobile station comprising:

a processor;

memory in electronic communication with the processor;

instructions stored in the memory, the instructions being arranged, when executed by the processor to:

participate in an initial ranging procedure in response to determining that the mobile station has mobile-originated SMS data to send;

participate in a bandwidth request ranging procedure in order to request that the base station allocate unicast bandwidth, wherein the instructions to participate in the bandwidth request ranging procedure are executable by the processor to:

receive allocation of a first unicast data grant via a Unicast Data Grant Information Element (IE) in a first uplink MAP (UL-MAP); and send a bandwidth request header to the base station to indicate the bandwidth needed to transmit the mobile-originated SMS data, the bandwidth request header being sent via the first unicast data grant to request allocation of unicast bandwidth;

send a mobile station SMS request message to a base station, wherein the mobile station SMS request message is sent using the allocated unicast bandwidth and comprises the mobile-originated SMS data; and receive a base station SMS response message from the base station in response to sending the mobile station SMS request message.

16. The mobile station of claim 15, wherein the initial ranging procedure results in allocation of a Basic Connection Identifier (CID) and a Primary Management CID to the mobile station.

17. The mobile station of claim 16, wherein the instructions to participate in the initial ranging procedure are executable by the processor to:

send an initial Code Division Multiple Access (CDMA) ranging code to the base station;

receive a first ranging response message from the base station;

receive allocation of a unicast transmission opportunity via a CDMA Allocation Information Element (IE) in an uplink MAP (UL-MAP) message;

send a ranging request message to the base station; and receive a second ranging response message from the base station, wherein the second ranging response message comprises the Basic CID and the Primary Management CID.

18. The mobile station of claim 16, wherein the instructions to participate in the bandwidth request ranging procedure are executable by the processor to:

send a bandwidth request Code Division Multiple Access (CDMA) ranging code to the base station;

receive a first ranging response message from the base station for allocation of the first unicast data grant; and receive allocation of a second unicast data grant via a second UL-MAP message according to the bandwidth request header, wherein the mobile station SMS request message is sent via the second unicast data grant.

19. The mobile station of claim 16, wherein the instructions are also arranged, when executed by the processor to:
  determine that the mobile station has not received the base station SMS response message from the base station within a timer T1 after sending the mobile station SMS request message; and
  repeat the bandwidth request ranging procedure and re-sending the mobile station SMS request message to the base station up to N times, wherein N is a configurable parameter.

20. The mobile station of claim 15, wherein the instructions are also arranged, when executed by the processor to:
  receive a broadcast page message, wherein the broadcast page message comprises a medium access control (MAC) address hash of the mobile station, and wherein an action code of the broadcast page message indicates that there is a downlink message pending for the mobile station; and
  participate in an initial ranging procedure in response to receiving the broadcast page message, wherein the initial ranging procedure results in allocation of a Basic Connection Identifier (CID) and a Primary Management CID to the mobile station; wherein the base station SMS request message is received from the base station with at least one of the Basic CID and the Primary Management CID.

21. The mobile station of claim 15, wherein the instructions are also arranged, when executed by the processor to:
  receive allocation of a data burst via an uplink MAP (UL-MAP) message for sending the mobile station SMS response message.

22. A base station for implementing Short Message Service (SMS), the base station being configured for operation in a WiMAX network, the base station comprising:
  a processor;
  memory in electronic communication with the processor;
  instructions stored in the memory, the instructions being executable by the processor to:
    participate in an initial ranging procedure with the mobile station;
    participate in a bandwidth request ranging procedure with the mobile station, wherein the instructions to participate in the bandwidth request ranging procedure are executable by the processor to:
      send allocation of a first unicast data grant via a Unicast Data Grant Information Element (IE) in a first uplink MAP (UL-MAP); and
      receive a bandwidth request header from the mobile station to indicate the bandwidth needed to transmit the mobile-originated SMS data , the bandwidth request header being received via the first unicast data grant, the bandwidth request header comprises a request for an allocation of unicast bandwidth;
    allocate unicast bandwidth to the mobile station according to the bandwidth request header;
    receive a mobile station SMS request message from a mobile station, wherein the mobile station SMS request message comprises mobile-originated SMS data and the mobile station uses the allocated unicast bandwidth to send the mobile station SMS request message; and
    send a base station SMS response message to the mobile station in response to receiving the mobile station SMS request message.

23. The base station of claim 22, wherein the base station allocates a Basic Connection Identifier (CID) and a Primary Management CID to the mobile station during the initial ranging procedure.

24. The base station of claim 23, wherein the instructions to participate in the initial ranging procedure are executable by the processor to:
  receive an initial Code Division Multiple Access (CDMA) ranging code from the mobile station;
  send a first ranging response message to the base station;
  allocate a unicast transmission opportunity to the mobile station via a CDMA Allocation Information Element (IE) in an uplink MAP (UL-MAP) message;
  receive a ranging request message from the mobile station; and
  send a second ranging response message to the mobile station, wherein the second ranging response message comprises the Basic CID and the Primary Management CID.

25. The base station of claim 23, wherein the instructions to participate in the bandwidth request ranging procedure are executable by the processor to:
  receive a bandwidth request Code Division Multiple Access (CDMA) ranging code from the mobile station;
  send a first ranging response message to the mobile station; and
  allocating a second unicast data grant via a second UL-MAP message according to the bandwidth request header, wherein the mobile station SMS request message is sent via the second unicast data grant.

26. The base station of claim 22, wherein the instructions are also arranged, when executed by the processor to:
  send a broadcast page message in response to the WiMAX network receiving the mobile-terminated SMS data, wherein the broadcast page message comprises a medium access control (MAC) address hash of the mobile station, and wherein an action code of the broadcast page message indicates that there is a downlink message pending for the mobile station;
  participate in an initial ranging procedure with the mobile station, wherein the base station allocates a Basic Connection Identifier (CID) and a Primary Management CID to the mobile station during the initial ranging procedure; and
  send the base station SMS request message to the mobile station with at least one of the Basic CID and the Primary Management CID.

27. The base station of claim 22, wherein the instructions are also arranged, when executed by the processor to allocate a data burst via an uplink MAP (UL-MAP) message for the mobile station to send the mobile station SMS response message.

28. The base station of claim 22, wherein the instructions are also arranged, when executed by the processor to:
  determine that the base station has not received the mobile station SMS response message from the mobile station within a timer T2 after sending the base station SMS request message; and
  re-send the base station SMS request message to the mobile station up to N times, wherein N is a configurable parameter.

29. A mobile station configured for implementing Short Message Service (SMS) while in idle mode, the mobile station being configured for operation in a WiMAX network, the mobile station comprising:

means for participating in an initial ranging procedure in response to determining that the mobile station has mobile-originated SMS data to send;
means for participating in a bandwidth request ranging procedure in order to request that the base station allocate unicast bandwidth, the means for participating in the bandwidth request ranging procedure comprising:
  means for receiving allocation of a first unicast data grant via a Unicast Data Grant Information Element (IE) in a first uplink MAP (UL-MAP); and
  means for sending a bandwidth request header to the base station to indicate the bandwidth needed to transmit the mobile-originated SMS data, the bandwidth request header being sent via the first unicast data grant to request allocation of unicast bandwidth;
means for sending a mobile station SMS request message to a base station, wherein the mobile station SMS request message is sent using the allocated unicast bandwidth and comprises the mobile-originated SMS data; and
means for receiving a base station SMS response message from the base station in response to sending the mobile station SMS request message.

30. The mobile station of claim 29, wherein the initial ranging procedure results in allocation of a Basic Connection Identifier (CID) and a Primary Management CID to the mobile station.

31. The mobile station of claim 30, wherein the means for participating in the initial ranging procedure comprises:
  means for sending an initial Code Division Multiple Access (CDMA) ranging code to the base station;
  means for receiving a first ranging response message from the base station;
  means for receiving allocation of a unicast transmission opportunity via a CDMA Allocation Information Element (IE) in an uplink MAP (UL-MAP) message;
  means for sending a ranging request message to the base station; and
  means for receiving a second ranging response message from the base station, wherein the second ranging response message comprises the Basic CID and the Primary Management CID.

32. The mobile station of claim 30, wherein the means for participating in the bandwidth request ranging procedure comprises:
  means for sending a bandwidth request Code Division Multiple Access (CDMA) ranging code to the base station;
  means for receiving a first ranging response message from the base station for allocation of the first unicast data grant; and
  means for receiving allocation of a second unicast data grant via a second UL-MAP message according to the bandwidth request header, wherein the mobile station SMS request message is sent via the second unicast data grant.

33. The mobile station of claim 30, further comprising:
  means for determining that the mobile station has not received the base station SMS response message from the base station within a timer T1 after sending the mobile station SMS request message; and
  means for repeating the bandwidth request ranging procedure and re-sending the mobile station SMS request message to the base station up to N times, wherein N is a configurable parameter.

34. The mobile station of claim 29, further comprising:
  means for receiving a broadcast page message, wherein the broadcast page message comprises a medium access control (MAC) address hash of the mobile station, wherein an action code of the broadcast page message indicates that there is a downlink message pending for the mobile station;
  means for participating in an initial ranging procedure in response to receiving the broadcast page message, wherein the initial ranging procedure results in allocation of a Basic Connection Identifier (CID) and a Primary Management CID to the mobile station; wherein the base station SMS request message is received from the base station with at least one of the Basic CID and the Primary Management CID.

35. The mobile station of claim 29, further comprising means for receiving allocation of a data burst via an uplink MAP (UL-MAP) message for sending the mobile station SMS response message.

36. A base station for implementing Short Message Service (SMS), the base station being configured for operation in a WiMAX network, the base station comprising:
  means for participating in an initial ranging procedure with the mobile station;
  means for participating in a bandwidth request ranging procedure with the mobile station, the means for participating in the bandwidth request ranging procedure comprising:
    means for sending allocation of a first unicast data grant via a Unicast Data Grant Information Element (IE) in a first uplink MAP (UL-MAP); and
    means for receive a bandwidth request header from the mobile station to indicate the bandwidth needed to transmit the mobile-originated SMS data, the bandwidth request header being received via the first unicast data grant, the bandwidth request header comprises a request for an allocation of unicast bandwidth;
  means for allocating unicast bandwidth to the mobile station according to the bandwidth request header;
  means for receiving a mobile station SMS request message from a mobile station, wherein the mobile station SMS request message comprises mobile-originated SMS data and the mobile station uses the allocated unicast bandwidth to send the mobile station SMS request message; and
  means for sending a base station SMS response message to the mobile station in response to receiving the mobile station SMS request message.

37. The base station of claim 36, wherein the base station allocates a Basic Connection Identifier (CID) and a Primary Management CID to the mobile station during the initial ranging procedure.

38. The base station of claim 37, wherein the means for participating in the initial ranging procedure comprises:
  means for receiving an initial Code Division Multiple Access (CDMA) ranging code from the mobile station;
  means for sending a first ranging response message to the base station;
  means for allocating a unicast transmission opportunity to the mobile station via a CDMA Allocation Information Element (IE) in an uplink MAP (UL-MAP) message;
  means for receiving a ranging request message from the mobile station; and means for sending a second ranging response message to the mobile station, wherein the second ranging response message comprises the Basic CID and the Primary Management CID.

39. The base station of claim 37, wherein the means for participating in the bandwidth request ranging procedure comprises:
    means for receiving a bandwidth request Code Division Multiple Access (CDMA) ranging code from the mobile station;
    means for sending a first ranging response message to the mobile station; and
    means for allocating a second unicast data grant via a second UL-MAP message according to the bandwidth request header, wherein the mobile station SMS request message is sent via the second unicast data grant.

40. The base station of claim 36, further comprising:
    means for sending a broadcast page message in response to the WiMAX network receiving the mobile-terminated SMS data, wherein the broadcast page message comprises a medium access control (MAC) address hash of the mobile station, and wherein an action code of the broadcast page message indicates that there is a downlink message pending for the mobile station;
    means for participating in an initial ranging procedure with the mobile station, wherein the base station allocates a Basic Connection Identifier (CID) and a Primary Management CID to the mobile station during the initial ranging procedure; and
    means for sending the base station SMS request message to the mobile station with at least one of the Basic CID and the Primary Management CID.

41. The base station of claim 36, further comprising means for allocating a data burst via an uplink MAP (UL-MAP) message for the mobile station to send the mobile station SMS response message.

42. The base station of claim 36, further comprising:
    means for determining that the base station has not received the mobile station SMS response message from the mobile station within a timer T2 after sending the base station SMS request message; and
    means for re-sending the base station SMS request message to the mobile station up to N times, wherein N is a configurable parameter.

43. A computer-program product for a mobile station in idle mode in a WiMAX network to implement Short Message Service (SMS), the computer-program product comprising a non-transitory computer-readable medium having instructions thereon, the instructions comprising:
    code for participating in an initial ranging procedure in response to determining that the mobile station has mobile-originated SMS data to send;
    code for participating in a bandwidth request ranging procedure in order to request that the base station allocate unicast bandwidth, the instructions for participating in the bandwidth request ranging procedure comprising:
        code for receiving allocation of a first unicast data grant via a Unicast Data Grant Information Element (IE) in a first uplink MAP (UL-MAP); and
        code for sending a bandwidth request header to the base station to indicate the bandwidth needed to transmit the mobile-originated SMS data, the bandwidth request header being sent via the first unicast data grant to request allocation of unicast bandwidth;
    code for sending a mobile station SMS request message to a base station, wherein the mobile station SMS request message is sent using the allocated unicast bandwidth and comprises the mobile-originated SMS data; and
    code for receiving a base station SMS response message from the base station in response to sending the mobile station SMS request message;
    response message, the base station SMS request message, and the mobile station SMS response message.

44. The computer-program product of claim 43, wherein the initial ranging procedure results in allocation of a Basic Connection Identifier (CID) and a Primary Management CID to the mobile station.

45. The computer-program product of claim 43, wherein the instructions further comprise:
    code for receiving a broadcast page message, wherein the broadcast page message comprises a medium access control (MAC) address hash of the mobile station, wherein an action code of the broadcast page message indicates that there is a downlink message pending for the mobile station;
    code for participating in an initial ranging procedure in response to receiving the broadcast page message, wherein the initial ranging procedure results in allocation of a Basic Connection Identifier (CID) and a Primary Management CID to the mobile station;
    wherein the base station SMS request message is received from the base station with at least one of the Basic CID and the Primary Management CID.

46. A computer-program product for a base station in a WiMAX network to implement Short Message Service (SMS), the computer-program product comprising a non-transitory computer-readable medium having instructions thereon, the instructions comprising:
    code for participating in an initial ranging procedure with the mobile station;
    code for participating in a bandwidth request ranging procedure with the mobile station, the instructions for participating in the bandwidth request ranging procedure comprising:
        code for sending allocation of a first unicast data grant via a Unicast Data Grant Information Element (IE) in a first uplink MAP (UL-MAP); and
        code for receiving a bandwidth request header from the mobile station to indicate the bandwidth needed to transmit the mobile-originated SMS data , the bandwidth request header being received via the first unicast data grant, the bandwidth request header comprises a request for an allocation of unicast bandwidth;
    code for allocating unicast bandwidth to the mobile station according to the bandwidth request header;
    code for receiving a mobile station SMS request message from a mobile station, wherein the mobile station SMS request message comprises mobile-originated SMS data and the mobile station uses the allocated unicast bandwidth to send the mobile station SMS request message; and;
    code for sending a base station SMS response message to the mobile station in response to receiving the mobile station SMS request message.

47. The computer-program product of claim 46, wherein the base station allocates a Basic Connection Identifier (CID) and a Primary Management CID to the mobile station during the initial ranging procedure.

48. The computer-program product of claim 46, wherein the instructions further comprise:
    code for sending a broadcast page message in response to the WiMAX network receiving the mobile-terminated SMS data, wherein the broadcast page message comprises a medium access control (MAC) address hash of the mobile station, and wherein an action code of the broadcast page message indicates that there is a downlink message pending for the mobile station;

code for participating in an initial ranging procedure with the mobile station, wherein the base station allocates a Basic Connection Identifier (CID) and a Primary Management CID to the mobile station during the initial ranging procedure; and code for sending the base station SMS request message to the mobile station with at least one of the Basic CID and the Primary Management CID.

\* \* \* \* \*